(12) United States Patent
Finlayson

(10) Patent No.: US 7,679,517 B2
(45) Date of Patent: Mar. 16, 2010

(54) IDENTIFYING APPARATUS

(75) Inventor: John Finlayson, Queensland (AU)

(73) Assignee: Aleis Trakit Pty Ltd, Queensland (AU)

( * ) Notice: Subject to any disclaimer, the term of this patent is extended or adjusted under 35 U.S.C. 154(b) by 1043 days.

(21) Appl. No.: 10/541,706

(22) PCT Filed: May 22, 2003

(86) PCT No.: PCT/AU03/00625

§ 371 (c)(1),
(2), (4) Date: Feb. 8, 2006

(87) PCT Pub. No.: WO2004/064506

PCT Pub. Date: Aug. 5, 2004

(65) Prior Publication Data

US 2006/0145875 A1    Jul. 6, 2006

(30) Foreign Application Priority Data

Jan. 24, 2003    (AU) ................ 2003900325

(51) Int. Cl.
   *A01K 29/00*    (2006.01)
(52) U.S. Cl. .................. 340/573.1; 119/908; 119/518
(58) Field of Classification Search ............. 119/502, 119/719, 720, 721, 840, 841, 842, 174, 858, 119/518; 606/116, 117; 340/573.1, 573.3, 340/573.4; 40/300, 301, 304
See application file for complete search history.

(56) References Cited

U.S. PATENT DOCUMENTS

| | | | | |
|---|---|---|---|---|
| 3,788,276 A | * | 1/1974 | Propst et al. | 119/174 |
| 4,288,856 A | * | 9/1981 | Linseth | 119/841 |
| 4,464,854 A | * | 8/1984 | Hall | 40/665 |
| 4,617,876 A | * | 10/1986 | Hayes | 119/842 |
| 4,798,175 A | * | 1/1989 | Townsend et al. | 340/572.7 |
| 5,183,008 A | * | 2/1993 | Carrano | 119/840 |
| 5,640,151 A | | 6/1997 | Reis et al. | |
| 5,653,192 A | * | 8/1997 | Sheen et al. | 119/51.02 |
| 5,711,246 A | * | 1/1998 | Yano et al. | 119/51.02 |
| 5,740,757 A | | 4/1998 | Smeester | |
| 5,803,015 A | * | 9/1998 | Rhodes et al. | 119/14.02 |
| 5,812,049 A | | 9/1998 | Uzi | |
| 5,845,692 A | * | 12/1998 | Kellem et al. | 160/118 |
| 5,959,526 A | * | 9/1999 | Tucker | 340/572.1 |

(Continued)

FOREIGN PATENT DOCUMENTS

CA    2163311 A1    5/1997

OTHER PUBLICATIONS

PCT International Search Report from International Application No. PCT/AU2003/000625 dated Jun. 27, 2003.

*Primary Examiner*—Yvonne R. Abbott
(74) *Attorney, Agent, or Firm*—Patterson & Sheridan, L.L.P.

(57) ABSTRACT

An identifying apparatus which can identify objects having electronic identification devices (EIDs). The identifying apparatus includes multiple EID readers positioned in a spaced apart relationship to define multiple pathways so that EIDs carried by the objects can pass in a single file through any one of the multiple pathways. Each EID reader is adapted to read any EID as the objects pass through any one of the pathways. Each EID carried by an object is recorded only once irrespective of the number of times an EID reader reads an EID.

19 Claims, 2 Drawing Sheets

U.S. PATENT DOCUMENTS

| | | | |
|---|---|---|---|
| 5,996,529 A * | 12/1999 | Sissom et al. | 119/14.14 |
| 6,019,061 A * | 2/2000 | Schulte | 119/14.03 |
| 6,213,058 B1 | 4/2001 | Byl | |
| 6,318,289 B1 * | 11/2001 | Pratt | 119/51.02 |
| 6,341,582 B1 * | 1/2002 | Gompper et al. | 119/840 |
| 6,346,885 B1 | 2/2002 | Curkendall | |
| 6,470,825 B1 * | 10/2002 | Johnson et al. | 119/51.02 |
| 6,474,263 B2 * | 11/2002 | Caja Lopez et al. | 119/174 |
| 6,507,278 B1 * | 1/2003 | Brunetti et al. | 340/541 |
| 6,516,744 B1 * | 2/2003 | Bjork et al. | 119/14.02 |
| 6,877,460 B1 * | 4/2005 | Ellis | 119/842 |
| 6,997,140 B2 * | 2/2006 | Finlayson | 119/858 |
| 7,316,202 B2 * | 1/2008 | Fantin et al. | 119/174 |
| 7,406,927 B2 * | 8/2008 | Baarsch et al. | 119/842 |
| 7,444,961 B1 * | 11/2008 | Ellis | 119/842 |
| 2002/0010390 A1 | 1/2002 | Guice et al. | |
| 2002/0063622 A1 | 5/2002 | Armstrong et al. | |

* cited by examiner

IDENTIFYING APPARATUS

FIELD OF INVENTION

This invention relates to identifying moving objects, typically livestock, by multiple reading devices, typically antennas, as the objects pass individually through multiple pathways, typically a multi-race.

BACKGROUND OF INVENTION

Generally the only reliable system at present for the identification of multiple moving objects, such as livestock, with identifying means, typically electronic identification devices such as transponders, is to move the objects in a single file through a single pathway past a single reader. This system may obtain accurate results, however it has limitations and disadvantages, for example in relation to livestock, the livestock have to go though a single pathway, typically a race, in single file, thus causing the livestock to spend more time in the yards waiting to be identified which can cause the livestock to become stressed. Also higher labour costs are incurred with such as system as staff are required for long periods of time in order herd livestock through a single race.

OBJECT OF INVENTION

It is an object of the invention to provide an identifying apparatus that ameliorates the disadvantage and limitations of the known art or at least provide the public with a useful choice.

SUMMARY OF INVENTION

In one-aspect the invention resides in an identifying apparatus to identify mobile objects, livestock or humans having electronic identification devices (hereinafter called EID's), typically transponders, the identifying apparatus including:
(i) multiple EID reading means, typically antennas, positioned in spaced apart relationship defining multiple adjacent pathways through which EID's carried by the objects, to be read, can pass in a single file through any one of the pathways and wherein each EID reading means is adapted to read any EID as the objects pass individually through any one of the pathways, and
(ii) computing means adapted to record each EID carried by an object only once irrespective the number of EID reading means reads an EID or irrespective of the direction or how many times the object passes the multiple pathways, the apparatus is also characterised by the provision of dividing means allowing objects to pass individually through a particular pathway.

Preferably the EID's are rumen pellets or ear tag transponders when the objects are livestock.

Preferably when the objects are humans the EID's can be electronic identification cards, neck tags, wrist or ankle bracelets or any other suitable EID's.

Preferably when the objects are humans the EID's can be used in conjunction with known biometric systems, typically face recognition systems or optical (eye/iris) recognition systems, or video or digital imaging systems.

Preferably the EID reading means is adapted to read the EID carried by the object irrespective of the speed of the object through the multiple pathways.

Preferably the multiple EID reading means come in modules to enable each EID reading means module to be releasably inter-connected to other EID reading means modules so that any number of EID reading means can be interconnected together to form the multiple pathways.

Preferably the width of the pathways can be adjusted so as to allow the identification apparatus to identify different types of objects, for example where the objects are livestock the width of the pathways can be adjusted from allowing cattle to pass individually through to allowing sheep to pass individually through.

Preferably the EID reading means are equally spaced apart from one another.

Preferably each EID reading means is adapted to read EID's at differing heights such as EID's carried by smaller objects, e.g. calves as opposed to those carried by larger objects e.g. fully grown cattle.

Preferably the EID reading means include angled divider means adapted to when the EID reading means are in a spaced apart relationship to provide each pathway with a narrowing width wherein the width of each pathway at a lower region is less than the width in an upper region so as to enable objects of differing heights and girth to pass individually through the pathways.

Preferably the EID reading means are synchronized by one or more control modules to enable the EID reading means to read a number of EID's simultaneously and to transmit the read data to the computer means which processes the data to record each EID carried by an object only once.

Preferably the control modules are connected to the computer means by way of communication cables and/or cabled computer network.

Preferably the control modules and the computer means include wireless means with either external or in built transmitters and receivers to allow data to be transmitted through a wireless network, such as GSM, between the control module and the computer means.

Preferably the identification apparatus includes a global positioning device so that in situations where the identification apparatus is situated in remote locations the exact location of the identification apparatus can be obtained using the global positioning network system.

Preferably, there is a visual and/or an audible alarm system such as a light and/or a buzzer or bell, respectively which is actuated when an object passes the EID reading means without activating the EID reading means.

Preferably the identification apparatus is associated with a marking means adapted to mark an object which do not activate the EID reading means as they pass through the pathways, typically the marking means used herein is that disclosed in PCT/AU02/00858.

Preferably the identification apparatus is associated with partitioned holding pens having drafting gates wherein livestock exiting a pathway can be directed through a drafting gate to selected holding pens, for example livestock that do not activate the EID reading means as they pass through the pathways can be drafted into a separate holding pen to that of the livestock that do activate the EID reading means.

Preferably the identification apparatus is adapted to count the objects as they pass through the pathways.

Preferably the identification apparatus is adapted to count the objects which do not activate the EID reading means as they pass through the pathways.

Preferably the identification apparatus includes counting means adapted to count objects as they pass through the pathways and provide a count of the number of objects with EID's and a count of the objects without EID's.

Preferably the identification apparatus includes motion sensing means adapted to activate the identification apparatus when a moving object is sensed by the motion sensing means, preferably as or just before the objects enter anyone of the pathways.

Preferably the motion sensing means is photoelectric sensing means wherein a beam of light between a photo emitter and a photo sensor device is interrupted by the passage of an object.

In the alternative, the motion sensing means can be infrared (IR) sensing means or microwave sensing means where infrared and microwave beams, respectively, are interrupted by the passage of an object.

Preferably the identification apparatus is mains powered, but can also be powered by rechargeable batteries capable of being recharged by solar power or other sources of charging.

Preferably the identification apparatus is portable and easily transportable.

Preferably the objects include livestock (such as cattle, horses, sheep, etc), fish, crustaceans, marine animals (such as seals, dolphins, sea lions, etc), penguins, humans, baggage, packages, carcasses, etc Other aspects of the invention are described herein.

BREIF DESCRIPTION OF THE DRAWINGS

Embodiments of the invention will now be described by way of example only, with reference to the accompanying drawings of which:

DESCRIPTION OF INVENTION

This invention will now be described in relation to a preferred embodiment of the invention, namely the identifying of livestock such as cattle. The following description is an exemplification only and is in no way limiting as it is envisaged that the invention can be used to identify any moving object having an EID whether the object be inanimate or animate.

Figure 1:
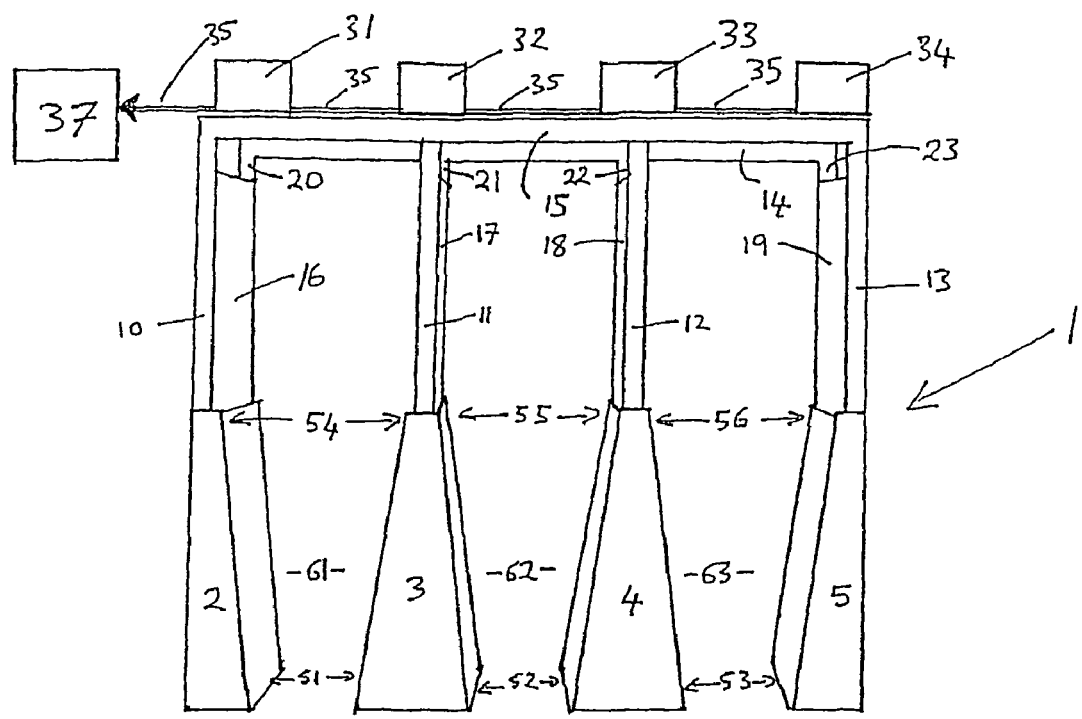
FIG. 1 is a front view of an identification apparatus in accordance to a first embodiment of the invention.

Turning to FIG. 1, there is shown an identification apparatus 1 in accordance to the invention, wherein the identification apparatus consists of a multiple number of pathways, typically multi-races 61, 62, 63 that are adapted to allow livestock to pass individually through any one of the races 61, 62, 63. The identification apparatus 1 includes a plurality of dividers, 2, 3, 4, 5 which define races 61, 62, 63 through which the cattle can pass individually through. Even though three races shown it is envisaged that any number of multiple races are possible.

In order to encourage and only allow the single file of cattle through each race 61, 62, 63, the dividers 2, 3, 4, 5 are angled so that base width 51, 52, 53 between each adjacent divider 2, 3, 4, 5 is narrower than the top width, 54, 55, 56 of the dividers 2, 3, 4, 5. Typically for cattle the base width 51, 52, 53, the top width 54, 55, 57 and narrowing angle are set so that any size cattle can pass through in single file. Other divider shapes that allow livestock or similarly other objects to pass individually through a race or pathway are possible.

The dividers are connected to an upper frame consisting of upright members 10, 11, 12, 13, 20, 21, 22, 23 and panels 16 17, 18, 19 situated therebetween. The upper ends of the upright members are connected to cross members 14 and 15.

Each divider and panel assembly include an EID reading means, typically an antenna, to read an EID carried by the livestock. Each EID reading means is adapted to read any EID as the livestock passes individually through any one of the races 61, 62, 63.

The EID reading means are synchronized by one or more control modules 31, 32, 33, 34 to enable the EID reading means to read a number of EID's simultaneously and to transmit the data read to a computer 37. Each EID reading means is capable of reading the EID of a livestock as it individually passes in an adjacent race and also simultaneously reading the EID of any other livestock passing through any of the other races. For example the EID reading means in divider 2 can read the EID of livestock passing individually through races 61, 62, 63 and send that single to control module 31.

The control modules 31, 32, 33, 34 are connected either physically by cable 35 (FIG. 1) or by wireless means (FIG. 3) to a computer 37. The wireless means can have either external or in built transmitters and receivers, typically satellite dishes 91, 92, 93, 94 (FIG. 3) to allow data to be transmitted through a wireless network, such as GSM, between the control modules 31, 32, 33, 34 and the computer 37. The computer receives the data from the control modules and is adapted to record each livestock's EID only once irrespective the number of EID reading means reads an EID or irrespective of the direction or how many times the object passes the multiple pathways.

Figure 2:
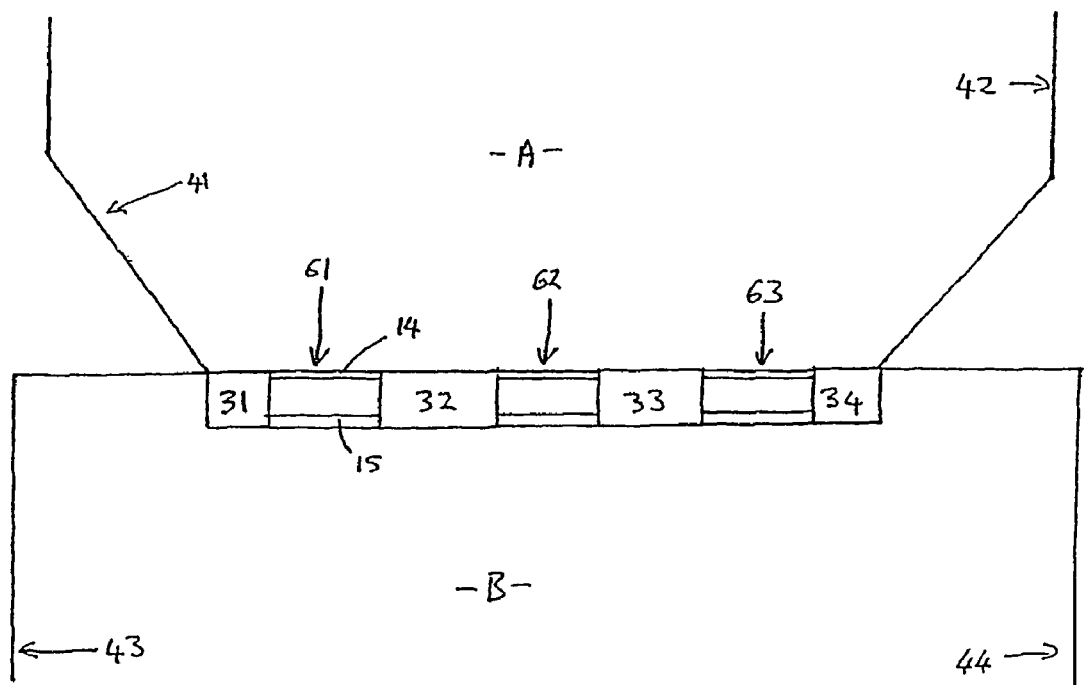
FIG. 2 is a top view identification apparatus as shown in FIG. 1 when in use in a stockyard.

FIG. 2 provides a top view of the identification apparatus 1 as shown in FIG. 1 in use in a cattle yard. The identification apparatus 1 is shown connected between a corralling yard A and holding pen B. Fence 41, 42 (partly shown) holds and guides the livestock towards and through the identification apparatus 1 and fence 43, 44 (partly shown) receives the livestock passing through the identification apparatus 1. In a further embodiment (not shown) the holding pen may be further partitioned with drafting gates so that livestock can be directed to selected holding pens, for example livestock that do not activate the EID reading means as they pass through the races can be drafted into a separate pen to that of the livestock that do activate the EID reading means. The identification apparatus can also be associated with a marking system (not shown), typically the marking system disclosed in Patent Application No. PCT/AU02/00858 whereby the marking system marks a particular livestock in accordance to its identification or lack thereof so that marked livestock can be readily visually identified and be separated from the herd, preferably in combination with the drafting gate system mentioned above or similar livestock separating system.

The identification apparatus 1 is able to count the livestock as they pass through the races and is able to count and provide results of the livestock which do and do not activate the EID reading means as they pass through the races.

The identification apparatus 1 includes motion sensors (not shown) that activate the identification apparatus 1 when moving livestock is sensed by the motion sensor. The motion sensors can be photoelectric sensors wherein a beam of light between a photo emitter and a photo sensor device is interrupted by the passage of an object. In the alternative, the motion sensors can be infrared (IR) sensing means or microwave sensing means where infrared and microwave beams, respectively, are interrupted by the passage of an object.

The identification apparatus is mains powered, but can also be powered by rechargeable batteries capable of being recharged by solar power or other sources of charging.

Figure 3:
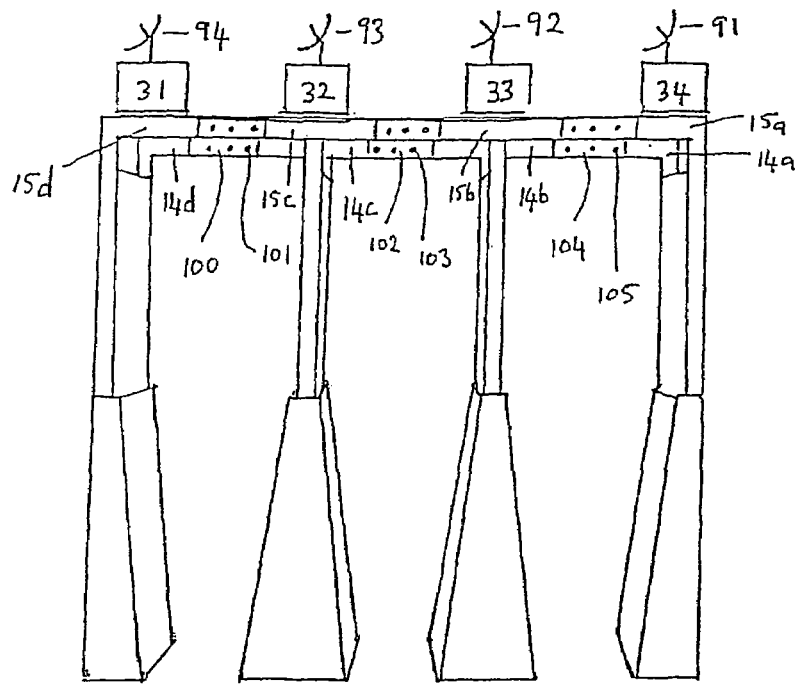
FIG. 3 is a front view of an identification apparatus in accordance to a second embodiment of the invention.

FIG. 3 shows a similar identification apparatus as shown in FIG. 1, however the control members are not connected directly to a computer, but are connected to transmitters, such as satellite dishes 91; 92, 93, 94 for transmitting data from each control member to a remote computer. This particular identification apparatus 1 would be suitable for very remote locations, such as farms or stockyards located in the outback of Australia. Also FIG. 3 shows a further modification whereby each divider, 2, 3, 4, 5 having multiple. EID reading means come in modules to enable each module to be releasably inter-connected to other modules so that any number of dividers with EID reading means can be interconnected together to form the multiple pathways. Also the modules allow the width of the races 61, 62, 63 to be adjusted so as to allow the identification apparatus 1 to be used identify different livestock, for example the width of the races 61, 62, 63 can be adjusted from allowing cattle to pass individually through to allowing sheep to pass individually through. In FIG. 3 the modular system includes adjustment plates 100, 102, 104 which allow the dividers to be joined together and to allow the distance between each divider to be adjusted to suit the size of the livestock being identified eg cattle, sheep, horses. Each cross member 14, 15 consists of sub-crossmembers 14*a*, 14*b*, 14*c*, 14*d* and 15*a*, 15*b*, 15*c*, 15*d*. Each adjacent sub-crossmember (14*a*+14*b*), (14*b*+14*c*), (14*c*+14*d*), etc are jointed together by respective the adjustment plates 100, 102, 104 and bolts 101, 103, 105.

Figure 4:
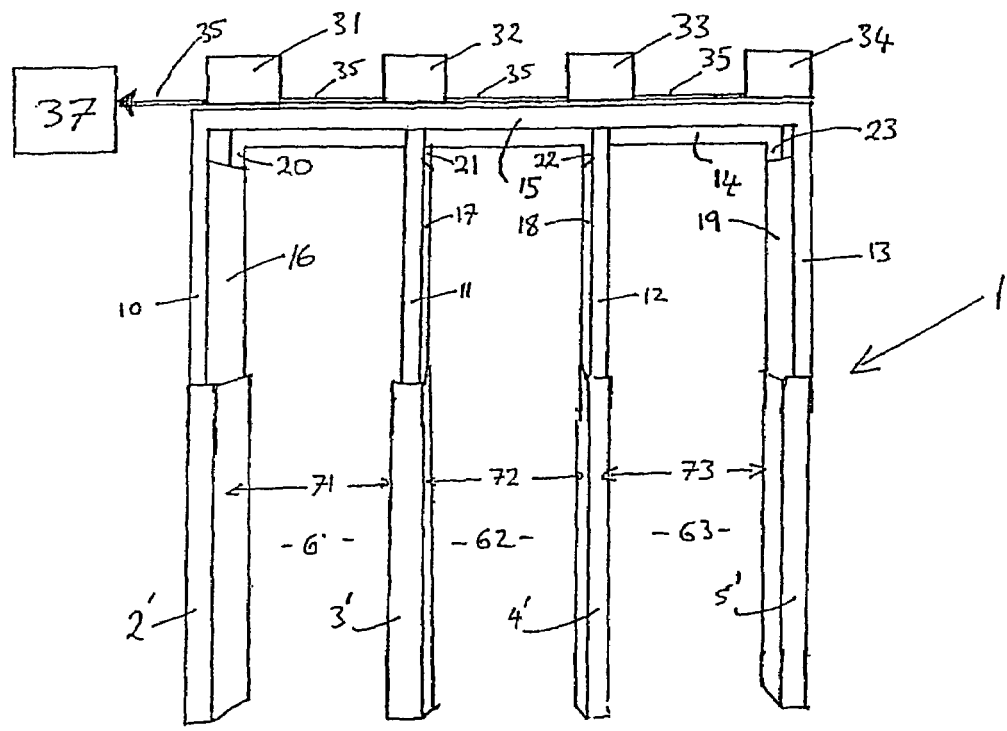
FIG. 4 is a front view of an identification apparatus in accordance to a second embodiment of the invention.

FIG. 4 shows a similar identification apparatus as shown in FIG. 1, however dividers are shown as having a rectangular cross-section so that the space 61, 62, 63 between the dividers 2', 3', 4', 5' have a constant width 71, 72, 73.

Other examples of the invention will now be described. The identification apparatus can be used to identify fish, for example the identification system can be adapted to be positioned in and across a river mouth to identify the return of tagged fish, such as salmon returning to spawn upstream. The identification system instead of having the dividers and frame work shown in FIG. 1 may have, in combination with fish netting, dividers of constant thickness and equally spaced apart to allow fish to pass individually or the dividers maybe cone shaped and dimensioned in order to allow fish to pass individually. The identification system can be used to identify tagged penguins moving to and from a penguin colony whereby the identification apparatus is positioned across the route the penguins use to go to and from the sea, similar for seals and other land based sea animals. The identification system can be used to identify humans entering and exiting a particular area, for example staff as they enter or leave a work place, such as a factory, can be identified by the identification cards or neck tags that can be read by the EID reading means. In order to verify that the correct person is carry the right identification card or neck tag the identification apparatus can used in conjunction with a biometric system, typically face recognition systems. The identification apparatus can be used at airports in association with airport security or could be used at prisons to identify and monitor inmates, in this situation the inmates could wear tamper proof ankle or wrist bracelets that include EID's.

ADVANTAGES

The advantages of the present invention over the prior art an be said to include the following:

The identification of multiple objects through multiple pathways by multiple EID readers (antennas).

The ability of all EID readers to read EID's simultaneously.

The ability of each EID reader to read the EID of any object irrespective of which pathway the object passes through.

The ability to record only once an objects EID irrespective of what direction or how many times the objects passes an EID reader.

The ability to vary the width of the pathways to suit the type of object being identified.

The ability accurately read an objects EID irrespective of the objects speed through a pathway.

The ability to use the identification apparatus in remote locations and have access to the data at another location.

Reduced labour costs.

In use with livestock, less time spent in stockyards, less stress on the livestock, less bruising and injury to livestock and their handlers.

VARIATIONS

Where in the foregoing description reference has been made to integers or components known equivalents, then such equivalents are deemed to be incorporated herein as if individually set forth.

Throughout the description of this specification the word "comprise" and variations of that word such as "comprises" and "comprising", are not intended to exclude other additives, components, integers or steps.

It is to be understood that the scope of the invention is not limited to the described embodiments and therefore that numerous variations and modifications may be made to these embodiments without departing from the scope of the invention.

The invention claimed is:

1. An identifying apparatus to identify objects having electronic identification devices (EID), the identifying apparatus including:
    multiple EID reading means positioned in a spaced apart relationship defining multiple pathways through which the objects can pass in a single file and wherein each EID reading means is adapted to read any EID passing through any one of the multiple pathways; and
    computing means adapted to record each EID only once irrespective of the number of times an EID is read by any one of the multiple EID reading means.

2. The identifying apparatus as claimed in claim 1, wherein the EIDs are rumen pellets, ear tag transponders, electronic identification cards, neck tags, or bracelets.

3. The identifying apparatus as claimed in claim 1, wherein the EID reading means are used in conjunction with one or more biometric systems.

4. The identifying apparatus as claimed in claim 1, wherein the multiple pathways are adapted to enable reading of EIDs irrespective of the physical size of each object.

5. The identifying apparatus as claimed in claim 1, wherein the EID reading means is adapted to read the EID carried by the object irrespective of the speed of the object through the multiple pathways.

6. The identifying apparatus as claimed in claim 1, wherein each EID reading means is in modular form and may be releasably connected to another EID reading means module so that a multiple of EID reading means modules can be connected together to define the multiple pathways.

7. The identifying apparatus as claimed in claim 1, wherein the width of the multiple pathways can be adjusted.

8. The identifying apparatus as claimed in claim 1, wherein each of the multiple EID reading means are equally spaced apart from one another.

9. The identifying apparatus as claimed in claim 1, wherein each EID reading means is adapted to read EIDs at differing heights.

10. The identifying apparatus as claimed in claim 1, further including an angled divider wherein the width of each pathway at a lower region is less than the width in an upper region.

11. The identifying apparatus as claimed in claim 1, wherein each EID reading means is synchronized by one or more control modules to enable each EID reading means to read a number of EIDs simultaneously and to transmit the data to the computing means.

12. The identifying apparatus as claimed in claim 1, wherein there is a visual and/or an audible alarm system which is actuated when an object passes the EID reading means without activating the EID reading means.

13. The identifying apparatus as claimed in claim 1, wherein the identifying apparatus is associated with a marking means adapted to mark objects which do not activate the EID reading means as they pass through the pathways.

14. The identifying apparatus as claimed in claim 1, wherein the identifying apparatus is associated with partitioned holding pens having drafting gates wherein livestock exiting a pathway can be directed through the drafting gates to a selected holding pen depending upon activation or not of the EID reading means.

15. The identifying apparatus as claimed in claim 1, wherein the identifying apparatus is adapted to count the objects as they pass through the pathways.

16. The identifying apparatus as claimed in claim 1, wherein the identifying apparatus is adapted to count the objects which do not activate the EID reading means as they pass through the pathways.

17. The identifying apparatus as claimed in claim 1, wherein the identifying apparatus includes motion sensing means adapted to activate the identifying apparatus when a moving object is sensed by the motion sensing means, preferably as or just before the objects enter any one of the pathways.

18. The identifying apparatus as claimed in claim 17, wherein the motion sensing means is photoelectric sensing means wherein a beam of light between a photo emitter and a photo sensor device is interrupted by the passage of an object.

19. The identifying apparatus as claimed in claim 17, wherein the motion sensing means is infrared (IR) sensing means or microwave sensing means where infrared and microwave beams, respectively, are interrupted by the passage of an object.

* * * * *